United States Patent [19]
Kaneff

[11] Patent Number: 5,947,281
[45] Date of Patent: Sep. 7, 1999

[54] UNFOLDING DISC HOLDER

[76] Inventor: Mitchell S. Kaneff, 216 E. 47th St., New York, N.Y. 10017

[21] Appl. No.: 09/110,475

[22] Filed: Jul. 6, 1998

[51] Int. Cl.[6] .................................................. B65D 85/57
[52] U.S. Cl. ..................... 206/313; 206/312; 206/308.1
[58] Field of Search ................................ 206/307, 308.1, 206/309, 310, 311, 312, 313, 493, 804

[56]              References Cited

U.S. PATENT DOCUMENTS

| | | | |
|---|---|---|---|
| 5,096,055 | 3/1992 | Opper | 206/45.13 |
| 5,188,229 | 2/1993 | Bernstein | 206/310 |
| 5,333,732 | 8/1994 | Budny et al. | 206/316.1 |
| 5,421,452 | 6/1995 | Hybiske | 206/308.1 |
| 5,450,953 | 9/1995 | Reisman | 206/310 |
| 5,685,424 | 11/1997 | Rozek et al. | 206/310 |
| 5,775,490 | 7/1998 | Baker et al. | 206/308.1 |

*Primary Examiner*—David T. Fidei
*Attorney, Agent, or Firm*—Myron Amer PC

[57]              ABSTRACT

In the handling of a CD its withdrawal from and replacement into a storage compartment of a multi-panel CD holder is achieved with minimal user-handling of the CD and using, instead, the folding and unfolding of the holder panels to alternately project and withdraw the CD relative to the storage compartment.

1 Claim, 2 Drawing Sheets

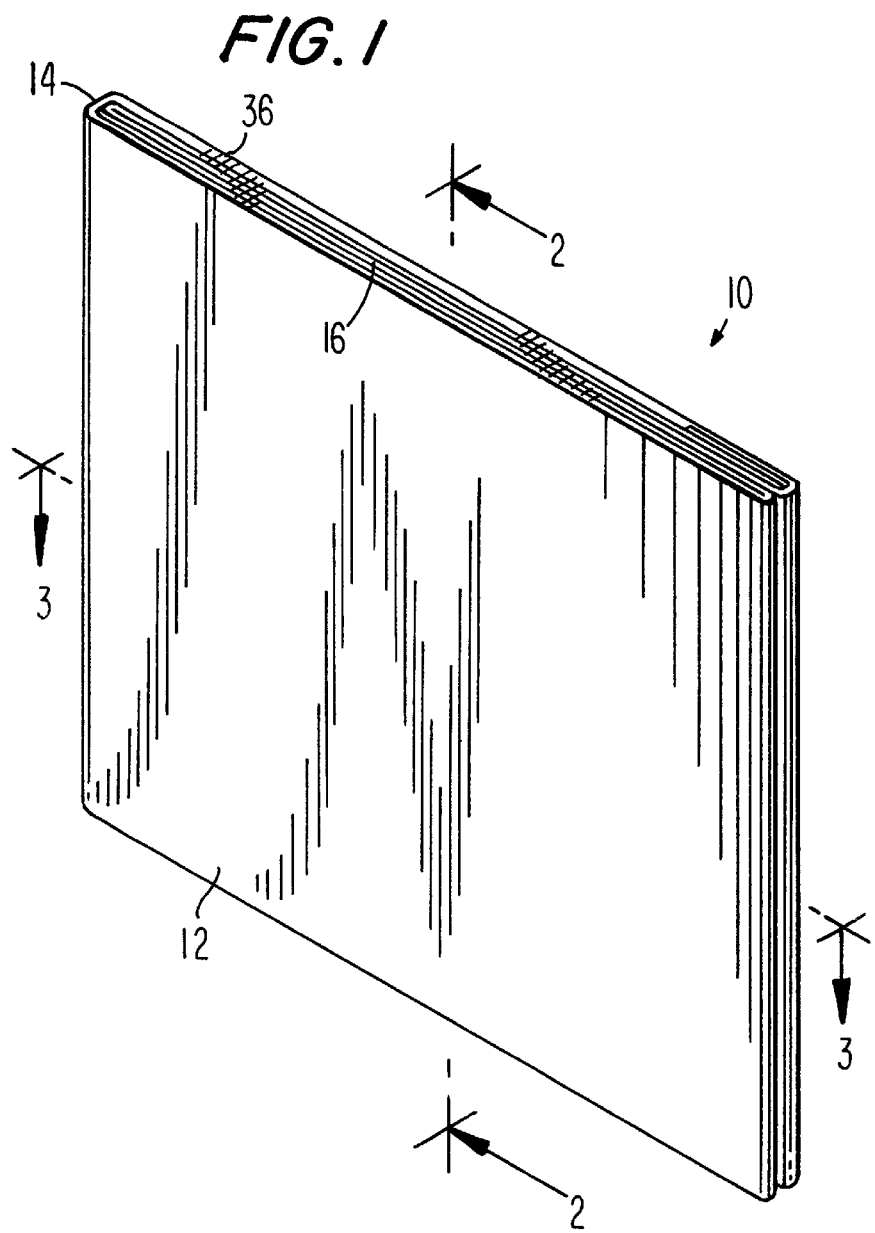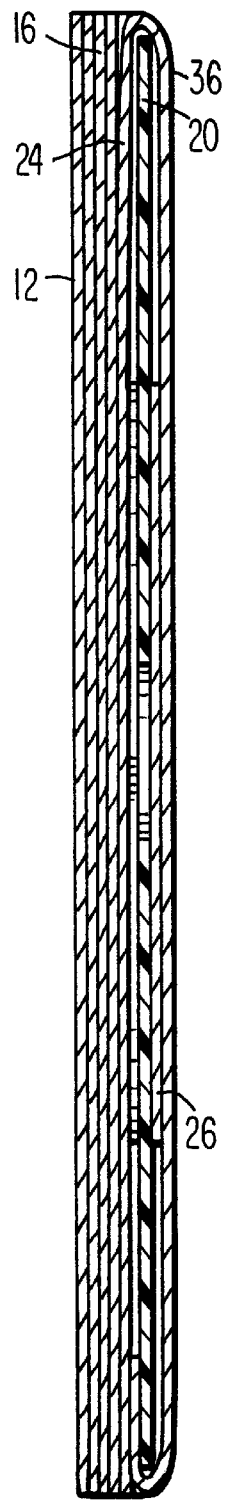

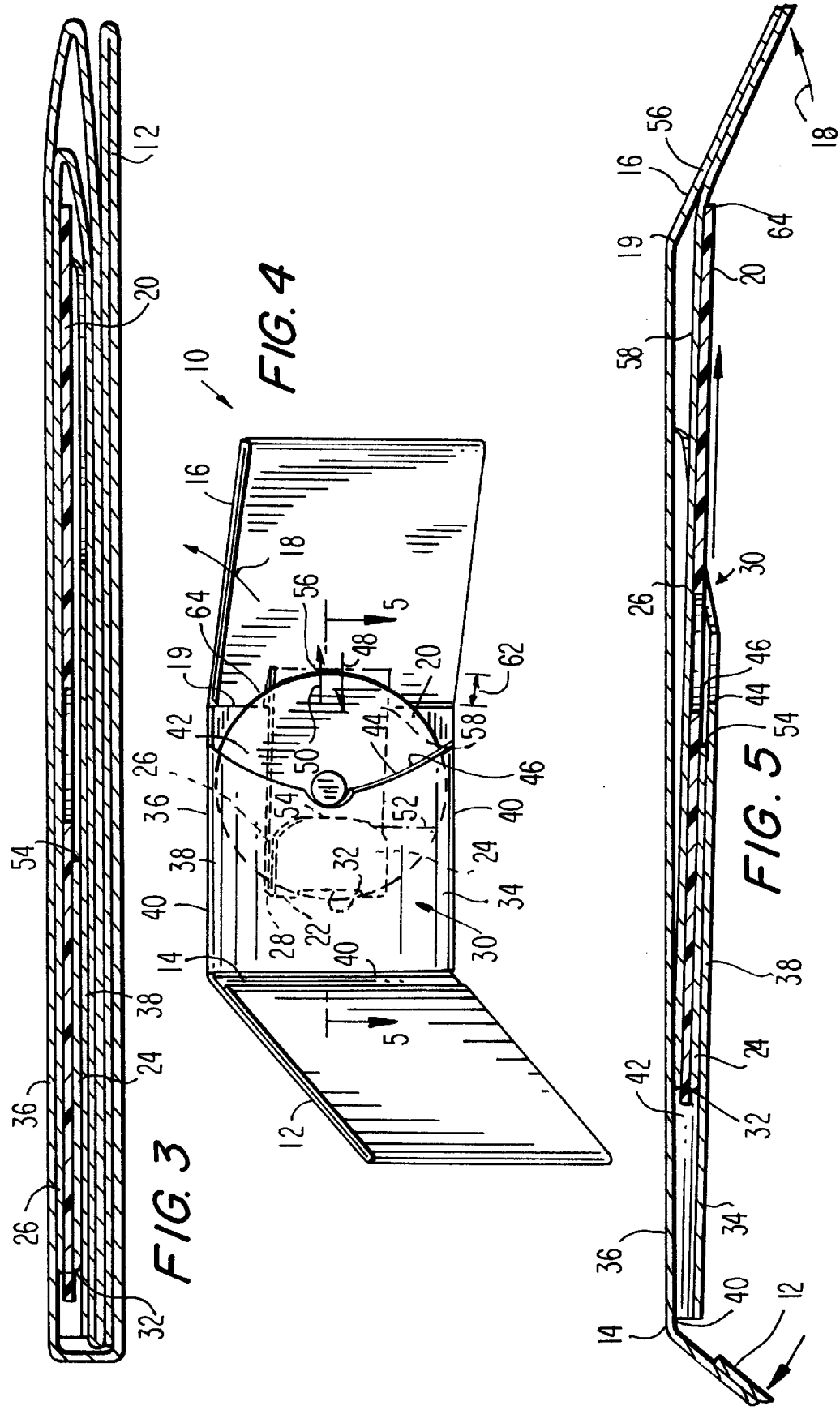

UNFOLDING DISC HOLDER

The present invention relates generally to improvements in the handling of a compact disc, popularly referred to as a CD which, by common experience, is known to require special handling to avoid scratching and marring of its recorded surface and, relates more particularly to a CD holder which in its operating mode provides not only a protective storage compartment for the CD but also, during insertion into, and removal from, the compartment effectively obviates any surface-marring contact with the CD.

BACKGROUND OF THE INVENTION

Field of the Invention

It is already known from prior patents, as exemplified by U.S. Pat. No. 2,384,633 issued to W. T. Markowski for "Article Storing Album" on Sep. 11, 1945, that surface-marring of a phonograph disc record or the like is obviated by storage, during its non-use, in a protective storage compartment. For a CD aficionado, however, an unacceptable marring could consist of a simple fingerprint.

In the '633 album or disc holder, there is manual handling of the disc during insertion into and withdrawal from its protective compartment, and also surface-to-surface sliding contact between the recorded disc surface and the walls bounding the storage compartment, both of which in addition to other circumstances, significantly contribute to the noted unacceptable marring of the disc.

U.S. Pat. No. 2,932,387 issued to B. F. Petersen for "Phonograph Record Extractor" on Apr. 12, 1960, is noted for its operating mode of avoiding manual contact with the record or disc during its removal from its storage compartment, but it still requires manual handling during replacement thereinto and does not to any significant extent avoid the surface-to-surface contact between the disc and the compartment walls.

SUMMARY OF THE INVENTION

Broadly, it is an object of the present invention to provide a CD holder overcoming the foregoing and other shortcomings of the prior art.

More particularly, it is an object to provide a CD holder having a CD protective compartment, and into and out of which, there is only nominal manual handling of the CD which correspondingly minimizes recorded surface marring, all of which will be better understood as the description proceeds.

BRIEF DESCRIPTION OF THE DRAWING

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a perspective view of the within inventive disc holder in a closed condition;

FIG. 2 is a sectional view taken along line 2—2 of FIG. 1;

FIG. 3 is a sectional view taken along line 3—3 of FIG. 1;

FIG. 4 is a front elevational view of the disc holder of FIG. 1, but in a partially open condition; and FIG. 5 is a partial sectional view taken along line 5—5 of FIG. 4.

DESCRIPTION OF THE PREFERRED EMBODIMENT

A compact disc, commonly known as a CD or simply as a disc, requires storage during non-use so as to obviate scratching and even merely fingerprints marring the recorded areas of the disc. The disc-storage means of choice is a disc holder, of which the within significantly improved by construction and operating mode inventive holder is shown in FIG. 4 and designated generally as 10. Still referring to FIG. 4, holder 10 includes, in a three panel version, a front panel 12 which folds open about a fold line 14 from a position in covering relation over an intermediate panel 16 into a clearance position therefrom as noted in FIG. 4. This uncovering of the panel 16 allows corresponding unfolding movement, as noted by arrow 18, of the panel 16. A disc 20 is engaged, as at 22, in an interposed position between two facing panels 24 and 26 attached to each other at an end-fold 28, which by function, as soon will be explained, serves as a sliding disc holder and is generally designated 30. Disc 20 is centered in the sliding disc holder 30 by being seated in a notch 32 in end fold 28.

In the remaining third or rear panel 34, use is made of two plies 36 and 38, as better shown in the cross sectional views, which are attached along three confronting edges, as at 40, so as to bound a disc storage compartment 42 therebetween. A forth edge 44 of the top ply 38, in a preferred curved shape as shown, bounds with the bottom ply 36 an opening 46 into the compartment 42. In use, the disc 20 in its operative position in the sliding disc holder 30 is urged in opposite directions into, as noted by arrow 48, and out of, as noted by arrow 50, the storage compartment 42.

Underlying the present invention is the recognition that withdrawal from and replacement back into, the compartment 42 can be achieved with minimal handling of the disc 20 by using to advantage the movements 48 and 50 resulting from corresponding folding and unfolding of the intermediate panel 16 about the fold line 19. More particularly, as measured from a reference line 52 underlying an edge 54 of the top panel 24 of the sliding disc holder 30 to a selected adhesive attachment site 56 on the intermediate panel 16, is a connecting strip 58. The length of the strip 58 is selected to cooperate with the distance 62 of the attachment site 56 beyond the fold line 19 to cause disc 20 to protrude, for convenient finger-gripping about its unrecorded peripheral edge 64 from the compartment 42 preparatory to sound-reproducing service of the disc 20.

To return the disc 20 to compartment 42, it is inserted in the sliding disc holder notch 32, and panel 16 folded in covering relation over the panel 34, after which in the three panel version, the panel 12 is folded closed over the panel 16, thus resulting in a compact storage condition of the disc holder 10 as shown in FIG. 1.

In a contemplated two panel version, panel 12 can be dispensed with.

While the disc holder herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A disc holder comprising a first front rectangular panel and a second rear rectangular panel disposed in superposed relation to each other bounding therebetween a compartment for non-use storage of a round disc having a specified diameter, said confronting edges of said first front and said second rear panels bounding an opening into said compartment with said confronting edge of said first front panel having a recess therein, a disc disposed in said compartment with a radial portion provided by said diameter thereof extending into said front panel recess to facilitate the gripping removal of said disc from said compartment, a disc holder having a first end and a second end disposed in an interposed position between said disc and said second rear panel adapted to be slidable in opposite directions in said compartment, said disc being connected to said slide holder second end so as to be slidable in unison therewith, a third panel attached adjacent said compartment opening and providing at a site of said attachment a fold line about which said third panel is moveable in folded relation upon said first panel and in unfolded relation in a clearance position from said first panel, and a connecting strip of a selected length connected in spanning relation between said disc holder second end and said third panel, whereby said length for said connecting strip is selected to cause sliding movement of said disc holder with a disc at least partially out of said compartment solely in response to an unfolding movement of said third panel.

* * * * *